F. WIECHARD.
VEHICLE WHEEL TIRE.
APPLICATION FILED OCT. 1, 1908.

960,212. Patented May 31, 1910.

Witnesses:
E. M. Morgan
M. E. Ruebush

Inventor:
Friedrich Wiechard.
by B. Singer Attorney.

UNITED STATES PATENT OFFICE.

FRIEDRICH WIECHARD, OF HANOVER, GERMANY.

VEHICLE-WHEEL TIRE.

960,212. Specification of Letters Patent. Patented May 31, 1910.

Application filed October 1, 1908. Serial No. 455,674.

*To all whom it may concern:*

Be it known that I, FRIEDRICH WIECHARD, a subject of the German Emperor, and resident of Hanover, Germany, have invented certain new and useful Vehicle-Wheel Tires, of which the following is a specification.

This invention relates to the fixation of solid rubber tires on the rims of motor car or other wheels.

It consists in inserting between the tire and the rim flange rings, rubber pads the object of which is to hold the tire securely but elastically on the rim and between the flanges of the latter.

The accompanying drawing, given by way of example, shows the preferred embodiment of the invention and in this drawing:—

Figure 1:
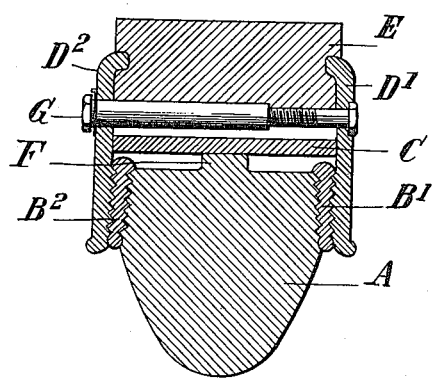
Figure 2:
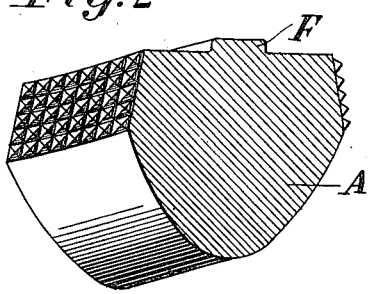
Figure 3:
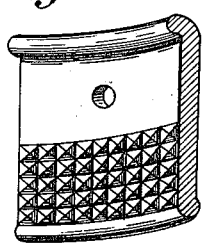

Figure 1 shows a cross section of the tire and of its mode of fixation; Fig. 2 is a perspective view of a section of the tire and Fig. 3 a similar view of a section of a flange ring of the rim.

The tire A is held upon the rim E or rather on the rim hoop C by the flange rings $D^1$, $D^2$ and by the connecting bolts G. The tire preferably rests upon the rim hoop not with its entire base but only with a rib F. This arrangement contributes to increase the elasticity. Now, according to the principles of the present invention rubber rings or pads $B^1$, $B^2$ are interposed between the tire A and the flange rings $D^1$, $D^2$, the tire as well as the inner surface of the flanges being serrated with a view of ascertaining a better engagement and a stronger hold and to prevent the tire creeping. The pads $B^1$, $B^2$ hold, it is true, the rubber tire in an absolutely sure and strong manner. However the connection is not absolutely rigid, and affords the tire a certain elastic movability inside the rim. This elasticity is still increased by the bearing rib F in the form of a ring which favors the movability of the tire especially in the radial direction. If, after a long use, the connection would get loose, the rubber pads may easily be replaced by new ones. As readily seen, the tire itself is not attacked nor injured by the tightening rings.

Having now fully described my said invention, what I claim and desire to secure by Letters Patent is:—

In a vehicle wheel, the combination with the felly, annular flanges secured thereto and projecting radially therefrom, the inner faces of said flanges being serrated at points beyond the periphery of the felly, a solid tire provided on its inner surface with an annular rib reduced in width with respect to the width of the base or inner surface of said tire and normally holding the base thereof out of contact with the felly, the side faces of said tire being serrated, and annular rings of yielding material having their opposite faces serrated and interposed between the serrated faces of said flange and tire, said rings having an internal diameter greater than the diameter of said felly, and normally out of contact therewith.

In testimony whereof I have hereunto set my hand in presence of two witnesses.

FRIEDRICH WIECHARD.

Witnesses:
 MENNOEQUE DE LA FAYETTE,
 PEMBROKE D. HARTON.